(12) United States Patent
Catalano et al.

(10) Patent No.: US 11,010,553 B2
(45) Date of Patent: May 18, 2021

(54) RECOMMENDING AUTHORS TO EXPAND PERSONAL LEXICON

(71) Applicant: International Business Machines Corporation, Armonk, NY (US)

(72) Inventors: Pasquale A. Catalano, Wallkill, NY (US); John S. Werner, Fishkill, NY (US); Andrew G. Crimmins, Montrose, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 15/956,050

(22) Filed: Apr. 18, 2018

(65) Prior Publication Data
US 2019/0325020 A1    Oct. 24, 2019

(51) Int. Cl.
*G06F 16/00* (2019.01)
*G06F 40/00* (2020.01)
(Continued)

(52) U.S. Cl.
CPC .......... *G06F 40/284* (2020.01); *G06F 16/31* (2019.01); *G06F 16/313* (2019.01); *G06F 16/38* (2019.01);
(Continued)

(58) Field of Classification Search
CPC .... G06F 40/284; G06F 40/289; G06F 40/295; G06F 40/30; G06F 40/40; G06F 40/56;
(Continued)

(56) References Cited

U.S. PATENT DOCUMENTS

| 5,794,177 | A | * | 8/1998 | Carus | G06F 40/268 704/9 |
| 6,236,980 | B1 | * | 5/2001 | Reese | G06Q 30/02 705/26.1 |

(Continued)

FOREIGN PATENT DOCUMENTS

| WO | WO2007139798 | * | 12/2007 |
| WO | WO 2010/082207 | * | 7/2010 |

OTHER PUBLICATIONS

Shinya Takamuku et al., "Lexicon Acquisition based on Behavior Learning", Proceedings of 2005 4th IEEE International Conference on Development and Learning, 2005, pp. 74-79.*
(Continued)

*Primary Examiner* — Srirama Channavajjala
(74) *Attorney, Agent, or Firm* — Cantor Colburn LLP; Teddi Maranzano

(57) ABSTRACT

A computer implemented method is provided for recommending at least one author of a plurality of authors to a user based on a learned lexicon of the user. First communication content pertaining to a user is obtained. Second communication content pertaining to an author is obtained. A lexicon of the user is learned from the first communication content to identify a set of words known to the user. High frequency words are identified from the second communication content of the author, the high frequency words being one or more words having an occurrence frequency in the second communication content that is higher than a first predetermined threshold occurrence frequency level. The author is suggested to the user upon detecting that the high frequency words are not in the lexicon of the user.

13 Claims, 7 Drawing Sheets

(51) Int. Cl.
*G06F 40/284* (2020.01)
*G06F 16/38* (2019.01)
*G06F 16/31* (2019.01)
*G06F 16/9038* (2019.01)
*G06F 16/9535* (2019.01)
*G06F 40/30* (2020.01)
*G06F 40/20* (2020.01)
*G06Q 50/00* (2012.01)

(52) U.S. Cl.
CPC ...... *G06F 16/9038* (2019.01); *G06F 16/9535* (2019.01); *G06F 40/20* (2020.01); *G06F 40/30* (2020.01); *G06Q 50/01* (2013.01)

(58) Field of Classification Search
CPC .... G06F 40/263; G06F 40/247; G06F 40/242; G06F 16/9577; G06F 16/68; G06F 16/635; G06F 16/374; G06F 16/951; G06F 16/3329; G06F 16/24578; G06F 16/3331; G06F 40/20; G06F 40/211; G06F 16/38; G06F 16/9038; G06F 16/313; G06F 16/9535; G06F 16/31; G06F 16/24522; G06F 16/435; G06F 16/35; G06K 9/00442; G06K 9/6885
See application file for complete search history.

(56) References Cited

U.S. PATENT DOCUMENTS

| | | | |
|---|---|---|---|
| 8,374,871 B2 | 2/2013 | Ehsani et al. | |
| 9,245,205 B1 | 1/2016 | Soldevila | |
| 9,680,945 B1 | 6/2017 | Treves et al. | |
| 9,787,785 B2* | 10/2017 | Liu | G06F 16/435 |
| 2002/0032564 A1 | 3/2002 | Ehsani et al. | |
| 2003/0204392 A1* | 10/2003 | Finnigan | G06F 40/242 704/10 |
| 2003/0204400 A1* | 10/2003 | Marcu | G06F 40/242 704/251 |
| 2005/0086046 A1* | 4/2005 | Bennett | G06F 16/24522 704/2 |
| 2005/0091031 A1* | 4/2005 | Powell | G06F 40/242 704/4 |
| 2005/0108001 A1* | 5/2005 | Aarskog | G06F 40/289 704/10 |
| 2007/0276653 A1* | 11/2007 | Greenwald | G06F 40/232 704/10 |
| 2009/0254884 A1* | 10/2009 | Rama | G06F 8/75 717/124 |
| 2010/0312769 A1* | 12/2010 | Bailey | G06F 16/35 707/740 |
| 2011/0010163 A1* | 1/2011 | Jansen | G06F 40/211 704/9 |
| 2011/0076654 A1 | 3/2011 | Green et al. | |
| 2011/0078157 A1* | 3/2011 | Sun | G06F 16/313 707/749 |
| 2011/0202330 A1* | 8/2011 | Dai | G06F 40/268 704/2 |
| 2012/0054220 A1* | 3/2012 | Zhang | G06F 16/374 707/769 |
| 2012/0123855 A1* | 5/2012 | Gu | G06Q 30/0241 705/14.46 |
| 2012/0124149 A1* | 5/2012 | Gross | H04L 67/10 709/206 |
| 2012/0271819 A1* | 10/2012 | Qiu | G06Q 30/02 707/723 |
| 2013/0185055 A1* | 7/2013 | Theoret | G06F 40/10 704/9 |
| 2014/0278374 A1* | 9/2014 | Kristensson | G06F 40/10 704/9 |
| 2015/0032443 A1* | 1/2015 | Karov | G06F 16/36 704/9 |
| 2015/0058380 A1* | 2/2015 | Polonsky | G06F 16/2457 707/812 |
| 2015/0169563 A1* | 6/2015 | Chen | G06F 16/24578 707/730 |
| 2016/0034483 A1 | 2/2016 | Ge et al. | |
| 2016/0293045 A1 | 10/2016 | Wang et al. | |
| 2016/0314191 A1* | 10/2016 | Markman | G06F 40/289 |

OTHER PUBLICATIONS

Motoi Nakayama, "Identifying Topics by using Word Distribution", IEEE Pacific Rim Conference on Communications, Computers and Signal Processing, 2007, pp. 245-248.*

Franz, Julia "A journalist uses statistics to uncover authors' 'cinnamon words'", Studio 360, retrieved at: https://www.pri.org/stories/2017-06-26/journalist-uses-statistics-uncover-authors-cinnamon-words; dated Jun. 26, 2017; downloaded Jun. 3, 2020; 7 pgs.

* cited by examiner

RECOMMENDING AUTHORS TO EXPAND PERSONAL LEXICON

BACKGROUND

The present invention relates to the field of natural language processing, and more specifically, author recommendation using tokenization from natural language processing to expand a personal lexicon of a user.

In some systems, communication content consists of text, audio, and even transformation of images to text by object recognition, expressed in a computer-readable format. This content is often user-generated and includes both professional and personal written works. Examples of communication content include websites, books, publications, and social media posts. Some communication content, such as social media posts, often contain metadata about the content to help provide not only content, but context. Metadata often includes information about location, engagement, and links shared. Communication content may provide insights regarding content creators, as content parsed from the communication content can be utilized by a number of applications. For example, social media posts may be parsed to help identify appropriate targeted advertising.

Natural language processing is a field concerned with the interactions between computers and human (natural) languages. Tokenization is the process of utilizing natural language processing to break-up a stream of text into words, phrases, symbols, or other meaningful elements called tokens. Tokenization typically occurs at the word level and takes into consideration punctuation, spaces, contractions, hyphens, and emoticons. Tokens generated from content may become input for further processing.

SUMMARY

Embodiments of the present invention provide a computer-implemented method for recommending at least one author, of a plurality of authors, to a user based on a learned lexicon of the user. A non-limiting example of the computer-implemented method includes receiving first communication content pertaining to a user, in which the first communication content includes one or more content sources read by the user or written by the user. The method includes receiving second communication content pertaining to an author, the second communication content includes one or more content sources written by the author. The method includes learning a lexicon of the user from the first communication content to identify a set of words known to the user. The method includes identifying high frequency words from the second communication content of the author, the high frequency words being one or more words having an occurrence frequency in the second communication content that is higher than a first predetermined threshold occurrence frequency level. The method includes suggesting the author to the user upon detecting that the high frequency words are not in the lexicon of the user.

Embodiments of the present invention provide a system for recommending at least one author, of a plurality of authors, to a user based on a learned lexicon of the user, in which the system includes one or more processors configured to perform a method. A non-limiting example of the computer-implemented method includes receiving first communication content pertaining to a user, in which the first communication content includes one or more content sources read by the user or written by the user. The method includes receiving second communication content pertaining to an author, the second communication content includes one or more content sources written by the author. The method includes learning a lexicon of the user from the first communication content to identify a set of words known to the user. The method includes identifying high frequency words from the second communication content of the author, the high frequency words being one or more words having an occurrence frequency in the second communication content that is higher than a first predetermined threshold occurrence frequency level. The method includes suggesting the author to the user upon detecting that the high frequency words are not in the lexicon of the user.

Embodiments of the invention provide a computer program product for recommending at least one author, of a plurality of authors, to a user based on a learned lexicon of the user, the computer program product comprising a computer readable storage medium having program instructions embodied therewith. The program instructions are executable by a system having one or more processors to cause the system to perform a method. A non-limiting example of the computer-implemented method includes receiving first communication content pertaining to a user, in which the first communication content includes one or more content sources read by the user or written by the user. The method includes receiving second communication content pertaining to an author, the second communication content includes one or more content sources written by the author. The method includes learning a lexicon of the user from the first communication content to identify a set of words known to the user. The method includes identifying high frequency words from the second communication content of the author, the high frequency words being one or more words having an occurrence frequency in the second communication content that is higher than a first predetermined threshold occurrence frequency level. The method includes suggesting the author to the user upon detecting that the high frequency words are not in the lexicon of the user.

Additional technical features and benefits are realized through the techniques of the present invention. Embodiments and aspects of the invention are described in detail herein and are considered a part of the claimed subject matter. For a better understanding, refer to the detailed description and to the drawings.

Figure 1:
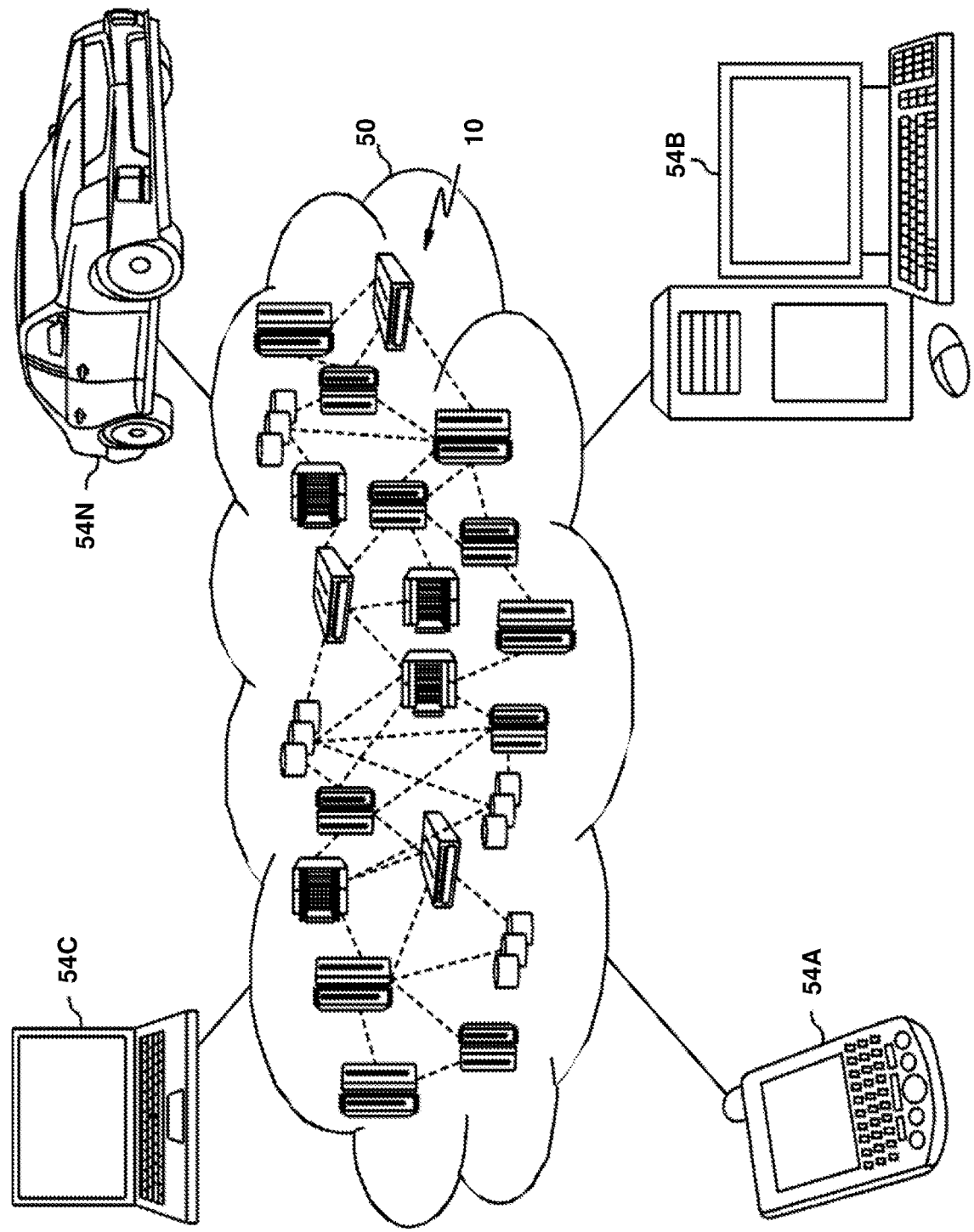
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
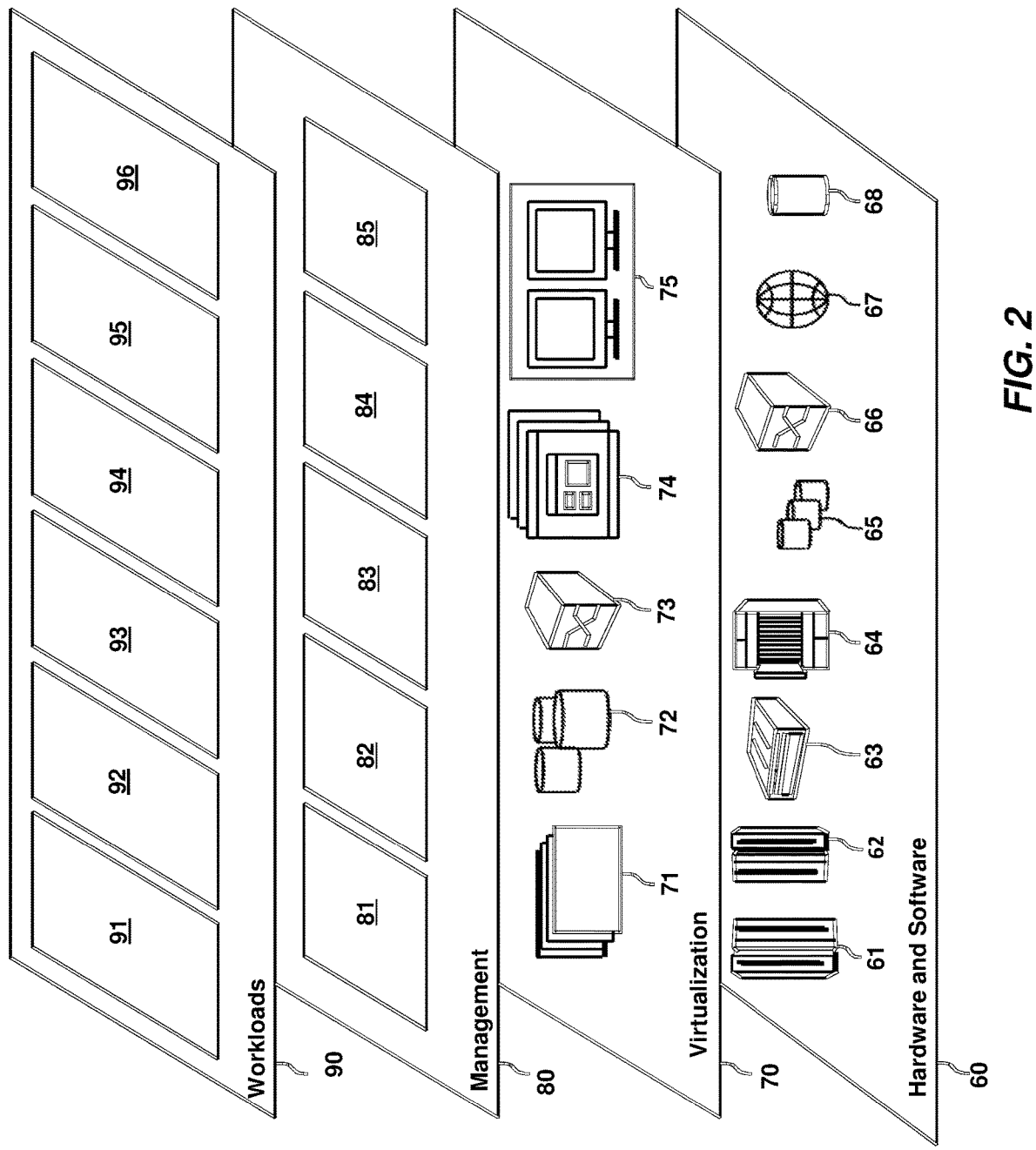
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tokenization and author recommendation processing 96.

Turning now to an overview of technologies that are more specifically relevant to aspects of the invention, as noted above, tokenization is a process utilized by some systems to break-up a stream of text into words, phrases, symbols, or other meaningful elements called tokens. Tokenization typically occurs at the word level and takes into consideration punctuation, spaces, contractions, hyphens, and emoticons. Some have utilized tokenization to generate a lexicon for a user to learn the vocabulary of the user.

Often users who seek to expand their vocabulary do so by increasing their reading consumption. For example, if a person wishes to expand their vocabulary, the person may seek out books that include words that they are not familiar with so that they may become more proficient with those words. The decision of which books to read may greatly impact the rate that a person learns new words as some books may have more unknown words as compared to others. Moreover, encountering the same new word several times increases the rate that the new word is learned by the person.

Using data analytics, it has been uncovered that some authors have a favorite set of words that occur in a frequency that is higher than would be expected. These words are colloquially referred to as "cinnamon words." The phrase originates from an anecdote about novelist Ray Bradbury, in which the novelist said, "My favorite word is cinnamon because it reminds me of my grandmother's pantry." For instance, in novels by Jane Austen, the terms civility, fancying, and imprudence have been ascertained to appear more often in her work as compared to the works of other authors, and thus those terms are her "cinnamon words." Similarly, the author Dan Brown utilizes the terms grail, masonic, and pyramid more often in his works as compared to the works of others.

Turning now to an overview of the aspects of the invention, one or more embodiments of the invention address the above-described shortcomings of the prior art by providing a method that recommends authors and/or books to users based on identifying an author who has "cinnamon words" (i.e. words having a high frequency of occurrence as compared to the works of other authors) that are not within the lexicon of the user. By recommending an author who frequently uses these words that are not presently in the user's vocabulary, the user will have a higher probability of encountering words outside their vocabulary as compared to reading books from randomly selected authors. The user will also have a higher probability of encountering those new words multiple times when reading books of that recommended author.

Figure 3:
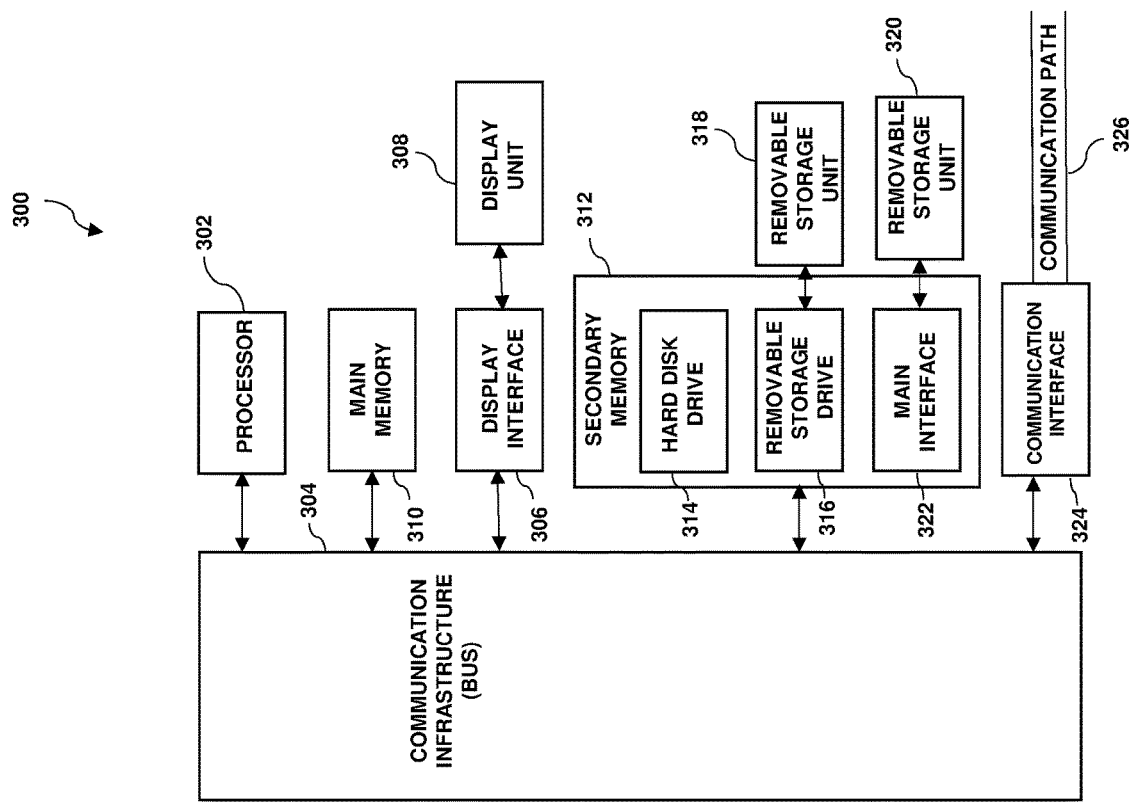
FIG. 3 depicts an exemplary computer system capable of implementing one or more embodiments of the present invention.

Turning now to a more detailed description of aspects of the present invention, FIG. 3 illustrates a high-level block diagram showing an example computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
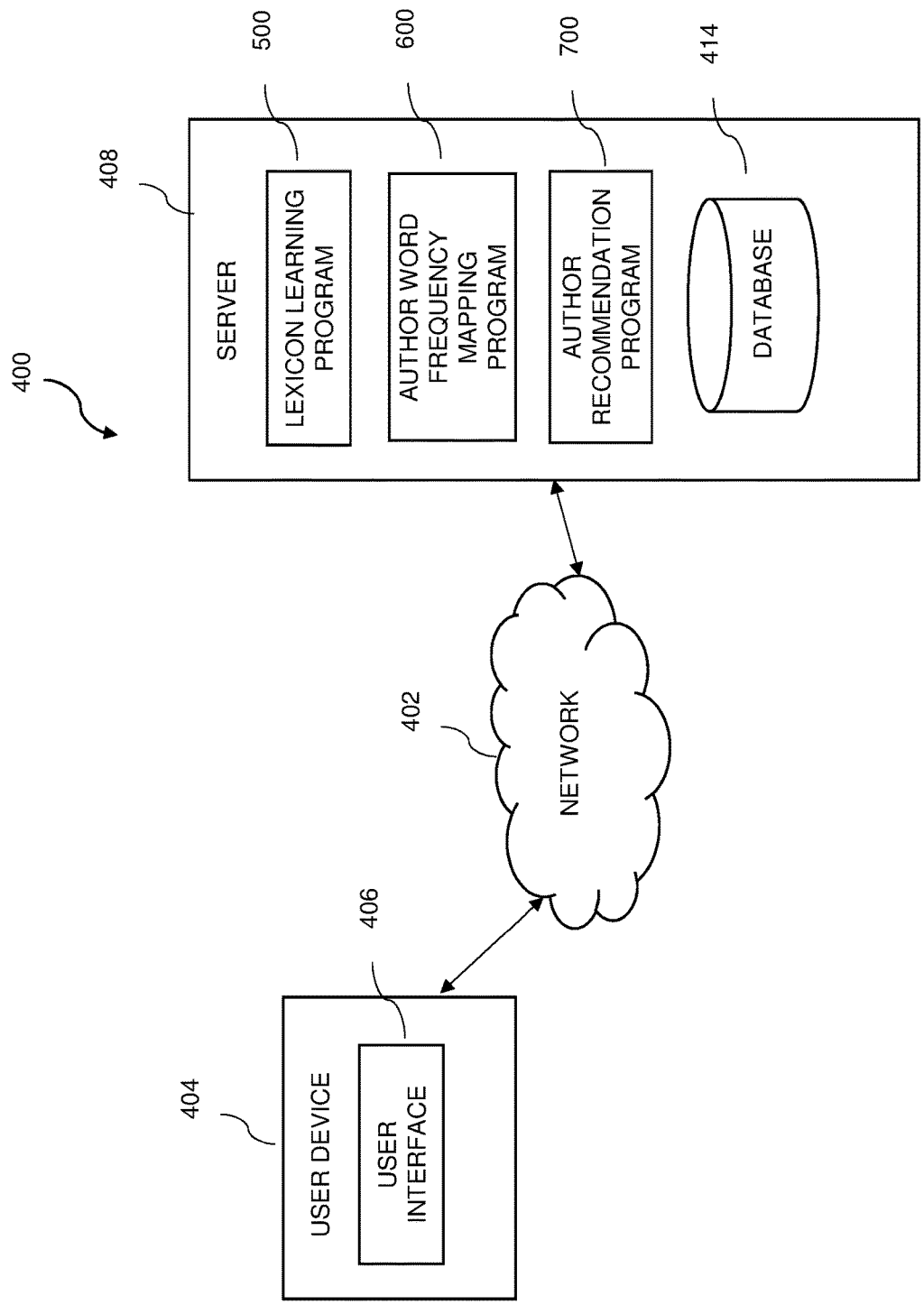
FIG. 4 depicts an example distributed data processing environment in accordance with one or more embodiments of the present invention.

Referring now to FIG. 4, an example distributed data processing environment 400 is presented for recommending at least one author of a plurality of authors to a user based on a learned lexicon of the user.

Distributed data processing environment 400 includes user device 404, which further includes a user interface 406; computer server 408, which further includes lexicon learning program 500, author word frequency mapping program 600, author recommendation program 700, and database 414; all of which are interconnected via network 402. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

In general, lexicon learning program 500 is configured to obtain communication content written and/or read by a user and to learn a vocabulary of the user based on received communication content such that a set of words that are known to the user can be identified. Author word frequency mapping program 600 is configured to process communication content written by an author to identify words that occur at a higher frequency in the communication content of the author as compared to communication content of other authors (i.e., "cinnamon words"). Author recommendation program 700 is configured to direct the user to the author upon detecting that the high frequency words of the author do not appear in the lexicon of the user (e.g., detecting that the set of words known to the user does not include the high frequency words of the author).

Network 402 can be, for example, a telecommunications network, a local area network (LAN), a wide area network (WAN), such as the Internet, or a combination of the three, and can include wired, wireless, or fiber optic connections. Network 402 can include one or more wired and/or wireless networks that are capable of receiving and transmitting data, voice, and/or video signals, including multimedia signals that include voice, data, and video information. In general, network 402 can be any suitable combination of connections and protocols that can support communications between user device 404, computer server 408, and/or other computing devices (not shown) within a distributed data processing environment 400. In some embodiments of the present invention, distributed data processing environment 400 is implemented as part of a cloud computing environment such as cloud computing environment 50 (FIG. 1).

User device 404 is configured to allow users to access the user interface 406, which in turn allows users to access lexicon learning program 500, author word frequency mapping program 600, and/or author recommendation program 700. In some embodiments of the present invention, user device 404 is a laptop computer, a tablet computer, a netbook computer, a personal computer (PC), a desktop computer, a personal digital assistant (PDA), a smart phone, or other suitable programmable electronic device capable of communicating with various components and devices within distributed data processing environment 400. In some embodiments of the present invention, user device 404 is a programmable electronic mobile device or a combination of programmable electronic mobile devices capable of executing machine readable program instructions and communicating with other computing devices (not shown) within distributed data processing environment 400. User device 404 includes a user interface 406. In some embodiments of the present invention, user device 404 may include internal and external hardware components, such as those depicted and described above with respect to FIG. 3.

In some embodiments of the present invention, computer server 408 is a standalone computing device, a management server, a web server, a mobile computing device, or other suitable electronic device and/or computing system capable of receiving, sending, and processing data. In some embodiments of the present invention, computer server 408 is a server computing system utilizing multiple computers, such as in cloud computing environment 50. In some embodiments of the present invention, computer server 408 is a laptop computer, a tablet computer, a netbook computer, a personal computer (PC), a desktop computer, a personal digital assistant (PDA), a smart phone, or other suitable programmable electronic device capable of communicating with user device 404 and other computing devices (not shown) within distributed data processing environment 400 via network 402. In some embodiments of the present invention, computer server 408 is a computing system utilizing clustered computers and components (e.g., database server computers, application server computers, etc.) that act as a single pool of seamless resources that are accessible within distributed data processing environment 400.

Computer server 408 includes lexicon learning program 500, author word frequency mapping program 600, author recommendation program 700, and database 414. In some embodiments of the present invention, lexicon learning program 500, author word frequency mapping program 600, and/or author recommendation program 700 are interconnected with database 414 via communication infrastructure 304 and/or communication path 326. Computer server 408 may have internal and external hardware components, such as those depicted and described above with respect to FIG. 3.

As noted above, lexicon learning program 500 is configured to learn a lexicon of a user. In particular, lexicon learning program 500 is configured to learn a lexicon of a user, based on communication content that users of user interface 406 have read, written, and received as input. Other media types, such as video or audio content the user has viewed, listened to, or orated may also be received as inputs. In some embodiments of the present invention, a user of user interface 406 uses lexicon learning program 500 to register and create a unique user lexicon profile. Lexicon learning program 500 receives input of communication content that the user has read and/or written. Communication content utilized in lexicon learning program 500 are written to computer-readable media.

Lexicon learning program 500 uses natural language processing tokenization to tokenize the communication content. Lexicon learning program 500 generates a lexicon frequency index using tokens established from tokenization of communication content. The lexicon frequency index is based on how often particular tokens are used within the communication content sources received as input. In some embodiments of the present invention, lexicon learning program 500 updates the lexicon frequency index based on receipt of new communication content. Lexicon learning program 500 determines a lexicon reading level for a specific user based on the user's lexicon frequency index. Lexicon learning program 500 is depicted and described in further detail with respect to FIG. 5.

Figure 6:
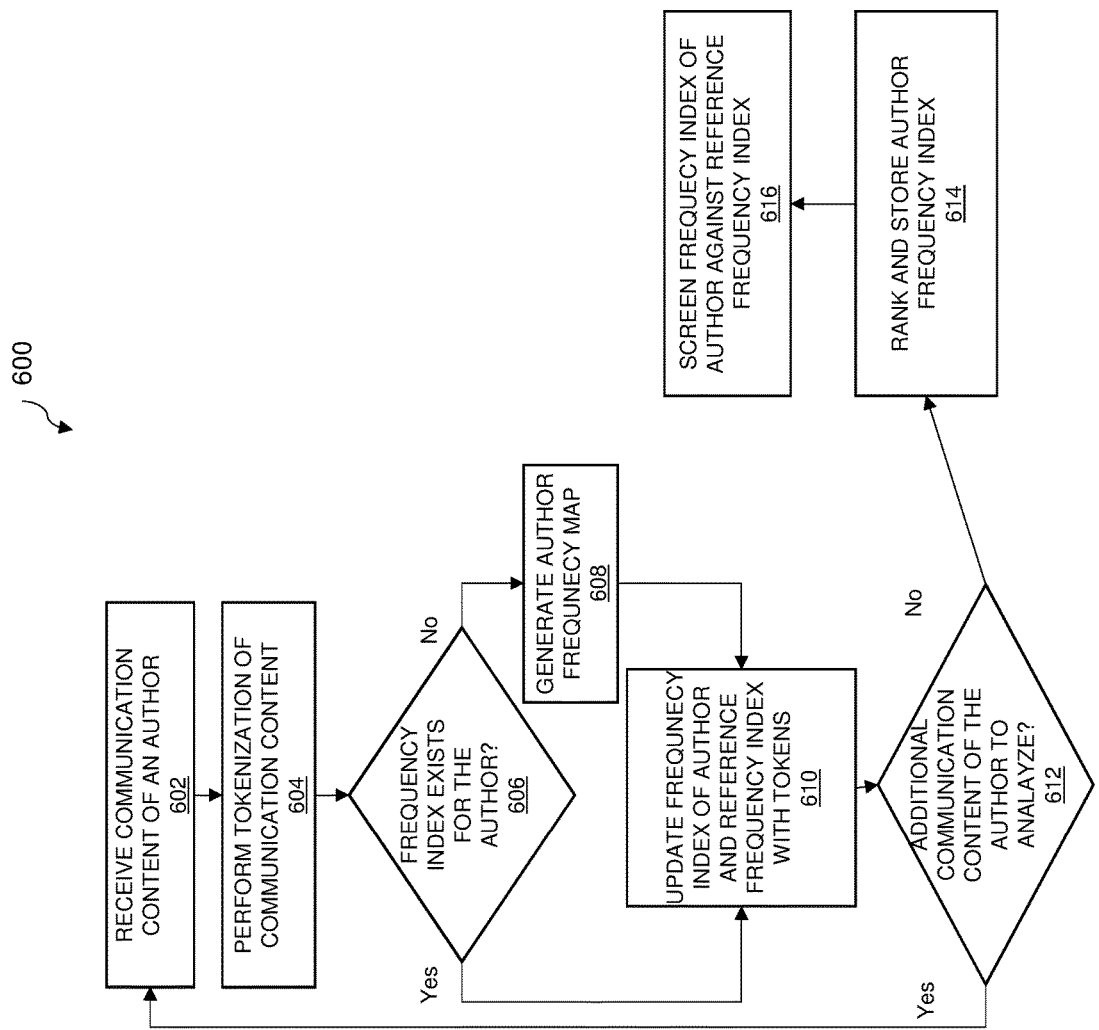
FIG. 6 depicts example operational steps of an example author word frequency mapping program, on a computer server, within the distributed data processing environment of FIG. 4, in accordance with one or more embodiments of the present invention.

Author word frequency mapping program 600 is configured to process communication content written by authors to identify words that occur at a higher frequency in the communication content of a given author as compared to communication content of other authors (i.e., "cinnamon words"). In particular, author word frequency mapping program 600 uses natural language processing tokenization to tokenize communication content written by an author. Author word frequency mapping program 600 then generates a lexicon frequency index of the author using tokens established from tokenization of communication content written by the author. The lexicon frequency index of the author is based on how often particular tokens are used within the communication content sources of the received input for the author. Author word frequency mapping program 600 then screens the lexicon frequency index of the author against a reference frequency index of a plurality of authors to remove naturally occurring high frequency tokens (e.g., "the", "she", "a"). For example, in some embodiments of the present invention, author word frequency mapping program 600 outputs a lexicon frequency index for each author whose work has been analyzed, with tokens of the index being sorted by frequency of occurrence in communication content of that author. The reference frequency index is a summation of lexicon frequency indexes, of a plurality of authors, that were generated from communication content of the plurality of authors. For example, given a set of three authors (A, B, and C), the reference frequency index would include tokens that were generated from communication content written by author A, tokens that were generated from communication content written by author B, and tokens that were generated from communication content written by author C. As the reference frequency index includes tokens from all communication content processed for a plurality of authors, the reference frequency index can be used to learn the natural frequency of tokens across authors. Communication content utilized in author word frequency mapping program 600 can be written to computer-readable media. Author word frequency mapping program 600 is depicted and described in further detail with respect to FIG. 6.

Author recommendation program 700 is configured to suggest an author and/or specific work to a user based on detecting whether the author's "cinnamon words" appear in the lexicon of the user. In particular, author recommendation program 700 obtains a lexicon frequency index of the user and compares it to the screened frequency index of the author. If there are words that are not in the lexicon frequency index of the user, the author and/or specific work is added to a recommendation list. If all the high frequency words of an author are found in the lexicon frequency index of the user, the author and/or specific work is not included in the list. Author recommendation program 700 is depicted and described in further detail with respect to FIG. 7.

Database 414 is a repository for data used by lexicon learning program 500, author word frequency mapping program 600, and/or author recommendation program 700. In the depicted embodiment, database 414 resides on computer server 408. In another embodiment of the present invention, database 414 may reside elsewhere within distributed data processing environment 400 provided lexicon learning program 500, author word frequency mapping program 600, and author recommendation program 700 have access to database 414, for example, via network 402. A database is an organized collection of data and the data relative to embodiments of the present invention that are included in database 414 are associated with functions of lexicon learning program 500, author word frequency mapping program 600, and/or author recommendation program 700. Database 414 stores communication content associated with the user's lexicon profile as well as communication content associated with the authors. For example, in some embodiments of the present invention, database 414 stores for each author in a set of predetermined authors, communication content that is associated with that individual author (e.g., books written by each author of a plurality of authors).

Database 414 may also store metadata regarding communication content sources, a lexicon frequency index associated with works of an individual user, a lexicon frequency index that is associated with works of an individual author, as well as a reference frequency index that is associated with works of a plurality of authors. For example, a user of lexicon learning program 500 creates a lexicon profile and links several communication content sources. A document is obtained from the communication sources to generate a lexicon frequency index for the user to identify a lexicon of the user. Database 414 would store the lexicon profile, the lexicon frequency index, and the generated lexicon that are outputted from lexicon learning program 500 as well as store the communication content sources received as input by the user. The user may add additional communication content sources or remove previously linked communication content sources over time. Database 414 would also store metadata regarding the communication content sources linked to the user's lexicon profile and the authors in order to create the user's lexicon frequency index and the author's lexicon frequency index. Database 414 may also store a dictionary, thesaurus, and word difficulty indexes that can be referenced by lexicon learning program 500. Information on database 414 may be transferred or stored over network 402. Database 414 can be implemented with various types of storage devices capable of storing data and configuration files accessed and utilized by computer server 408, such as a database server, a hard disk drive, or a flash memory.

Figure 5:
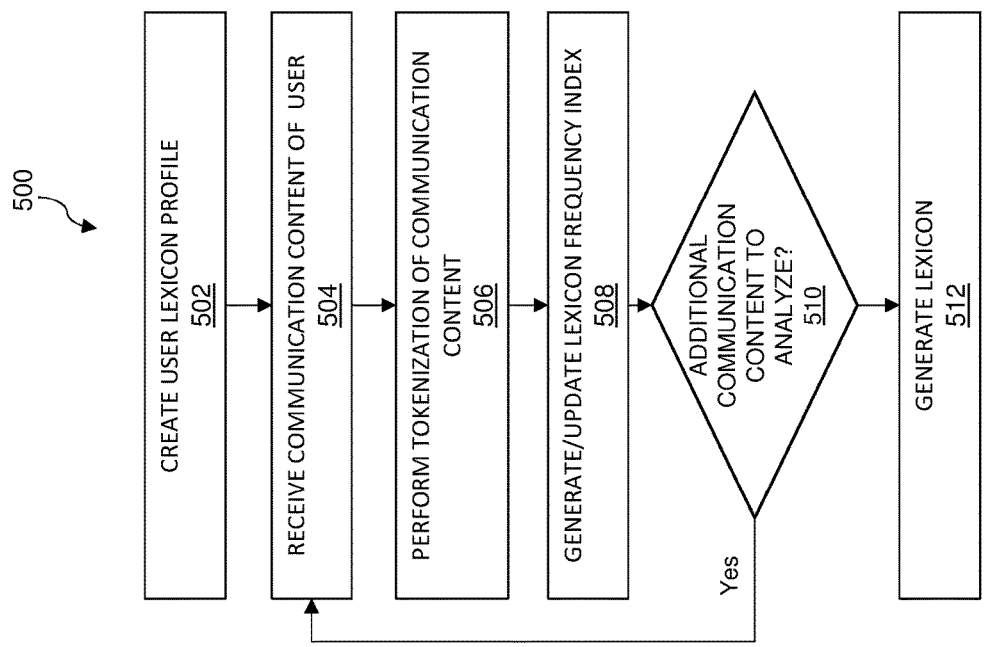
FIG. 5 depicts example operational steps of a lexicon learning program, on a computer server, within the distributed data processing environment of FIG. 4, in accordance with one or more embodiments of the present invention.

FIG. 5 illustrates operational steps of lexicon learning program 500, on computer server 408, within a distributed data processing environment 400 of FIG. 4, for generating a lexicon based on communication content received for a user, in accordance with an embodiment of the present invention.

Lexicon learning program 500 creates a lexicon profile (step 502). In an embodiment of the present invention, a user registers a lexicon profile with lexicon learning program 500 and links communication content sources. A user accesses user device 404 of FIG. 4 via user interface 406. Lexicon learning program 500 accesses the linked communication content sources. In some embodiments of the present invention, communication content sources consist of content expressed in a computer-readable format. In some embodiments of the present invention, communication content sources include sources users have read or written. For example, in some embodiments of the present invention, communication content sources read by a user include websites, books, and/or online journals that are being linked to a user via the user's lexicon profile. In some embodiment of the present invention, communication content sources that are written by the user and linked to the user's lexicon profile include publications, social media posts, emails, SMS text messages, and/or locally stored documents. Once registered, the lexicon profile may be accessed by the user and the user may link or unlink communication content sources. For example, a user of lexicon learning program 500 creates a lexicon profile with lexicon learning program 500. The user links communication content sources to the lexicon profile. The user is able to associate and/or link their typed text messages, typed emails, social media profiles, and authored short stories to their lexicon profile. Lexicon profiles may be stored on database 414 of FIG. 4.

Lexicon learning program 500 receives communication content from communication content sources (step 504). In an embodiment of the present invention, lexicon learning program 500 accesses and retrieves computer-readable communication content sources to which a user has linked to the user's lexicon profile. For example, a user of lexicon learning program 500 can link the user's lexicon profile to an account on a social cataloging application like "Goodreads" so that lexicon learning program 500 may access books the user has read. ("Goodreads" may be subject to trademark rights in various jurisdictions throughout the world and is used here only in reference to the products or services properly denominated by the marks to the extent that such trademark rights may exist). In another example, a user of lexicon learning program 500 can link the user's lexicon profile to a personal Twitter® account so that lexicon learning program 500 may access social media posts the user has written or read (Twitter is a registered trademark of Twitter Inc. in the U.S., and other countries worldwide). In another embodiment, lexicon learning program 500 accesses audio communication content linked to a lexicon profile. Lexicon learning program 500 utilizes speech-to-text recognition software (e.g., IBM Watson® Speech to Text API) to transform audio communication into a computer-readable format. For example, a user links an audio recording of an oral presentation to the user's lexicon profile. Lexicon learning program 500 utilizes speech-to-text software to transform the audio recording into a computer-readable format in order to utilize it as communication content input.

Lexicon learning program 500 uses natural language processing (e.g., Watson Natural Language Understanding API) tokenization on the entirety of the communication content sources received (step 506). Lexicon learning program 500 receives the series of characters (alpha characters, numeric characters, and punctuation marks or emoticons) that make up the content belonging to communication content sources and generates tokens from the content. Tokenization is the process of utilizing natural language processing to break-up a stream of text into words, phrases, symbols, or other meaningful elements. Tokenization takes into consideration punctuation, spaces, contractions, hyphens, and emoticons. For example, the text phrase "Friends, Romans, Countrymen, lend me your ears;" would likely generate the following tokens: "Friends", "Romans", "Countrymen", "lend", "me", "your", and "ears". In an embodiment of the present invention, lexicon learning program 500 accesses lexicons such as a computer readable dictionary, or simply a word list, to determine tokens within the communication content sources. In some embodiments, lexicons, such as computer readable dictionaries or word lists, may be stored in database 414 of FIG. 4.

Lexicon learning program 500 generates a lexicon frequency index for the user based on tokens obtained from communication content sources (step 508). The lexicon frequency index may be generated and updated as more tokens are obtained from communication content sources. The lexicon frequency index is based on how often particular tokens are used within the communication content sources received. The lexicon frequency index identifies tokens that a user reads or writes and keeps track of the frequency of which the tokens appear in the written or read content. For example, the text phrase "That's one small step for man, one giant leap for mankind" would generate tokens for each word of the phrase through natural language processing tokenization as described above. The lexicon frequency index would tabulate the tokens "one" and "for" as being used twice and the tokens "That's", "small", "step", "man", "giant", "leap" and "mankind" as being used once.

In an embodiment of the present invention, tokens generated from communication content sources written by a user are weighted higher on the lexicon frequency index than tokens generated from communication content sources read by a user. In another embodiment, tokens generated from communication content sources written by a user are weighted lower on the lexicon frequency index than tokens generated from communication content sources read by a user. In yet another embodiment, tokens generated from communication content sources written by a user and tokens generated from communication content sources read by a user are equally weighted. Correct use of the token, by the user, may also impact weighting. In an embodiment, an aging algorithm is utilized in generating the lexicon frequency index that determines if tokens have not been used for a period of time to account for a user's current vocabulary. In some embodiments of the present invention, if a token has not been used for a period of time, the token is removed from the user's lexicon frequency index. In some embodiments of the present invention, lexicon program 500 ignores pronouns, articles, prepositions, and conjunctions, and does not include them in the lexicon frequency index in order to not overpopulate the lexicon frequency index with commonly used words such as "the" and "a". Referencing the above example, lexicon program 500 would ignore the tokens "That's" and "for" as they are an article and a preposition respectively.

Having built the lexicon frequency index for the user, lexicon learning program 500 determines whether there is additional communication content to analyze (decision step 510). If additional communication content sources are received, lexicon learning program 500 updates the lexicon frequency index. Additional communication content sources result in additional tokens being generated, which may be added to the lexicon frequency index. For the case in which lexicon learning program 500 recognizes additional communication content sources were linked to the user's lexicon profile (step 510, "YES" branch), lexicon learning program 500 returns to step 504 to receive additional communication content sources and proceeds as described above. In this case, lexicon learning program 500 receives the additional communication content source and proceeds to utilize tokenization to update the lexicon frequency index for the specific user.

Lexicon learning program 500 generates a lexicon based on the lexicon frequency index of the user to identify a set of words that are known to the user (step 512). In some embodiments of the present invention, lexicon learning program 500 identifies the set of words that are known to the user based on the context in which the words are used in the communication content of the user and/or based on the number of times the words are encountered in the communication content of the user. For example, in some embodiments of the present invention, the set of words are identified by identifying, from the frequency index for the user, a subset of tokens that have an occurrence frequency in the communication content that is higher than a predetermined threshold occurrence frequency level. In some embodiments of the present invention, the predetermined threshold occurrence frequency is a minimum amount of times that a word would need to appear in at least a single communication content source of the communication content of the user (e.g., number of times a word would need to appear in a single book read and/or written by the user). In some embodiments of the present invention, the predetermined threshold occurrence frequency is a minimum amount of times that a word would need to appear across multiple communication content sources of the communication content of the user (e.g., a minimum number of times a word would need to appear in a combination of books read and/or written by the user, an average number of times a word would need to appear across all books read and/or written by the user, etc.). Other predetermined threshold occurrence frequency levels and/or algorithms may be used, as known to those having ordinary skill in the art, to determine a set of words that are believed to be known with high confidence by the user.

FIG. 600 illustrates operational steps of author word frequency mapping program 600, on computer server 408, within distributed data processing environment 400 of FIG. 4, for identifying words that occur in a higher frequency in the works of a specific author as compared to in the works of a plurality of authors (i.e., "cinnamon words"), in accordance with an embodiment of the present invention.

Author word frequency mapping program 600 receives communication content from communication content sources of an author (step 602). Communication content consists of content expressed in a computer-readable format. In some embodiments of the present invention, communication content sources written by the author include publications, social media posts, emails, SMS text messages, videos, audio records, and/or locally stored documents. In some embodiments of the present invention, in which communication content of the author includes audio and/or video data, word frequency mapping program 600 utilizes speech-to-text recognition software (e.g., Watson Natural Language Understanding API) to transform audio and/or video communication into a computer-readable format. As used herein, the terms "written by the author" refers to not only text that is directly provided by an author but also refers to text that may be indirectly provided by an author such as via extraction of text from video and/or audio data.

Author word frequency mapping program 600 uses natural language processing (e.g., Watson Natural Language Understanding API) tokenization to process the communication content sources received for the author (step 604). Author word frequency mapping program 600 receives the series of characters (alpha characters, numeric characters, and punctuation marks or emoticons) that make up the content belonging to communication content sources and generates tokens from the content. Similar to the tokenization process in step 506 of lexicon learning program 500, author word frequency mapping program 600 may access lexicons such as a computer readable dictionary, or simply a word list, to determine tokens within communication content sources written by the author (step 604). In some embodiments, lexicons such as computer readable dictionaries or word lists may be stored in database 414 of FIG. 4.

Having tokenized the communication content of the communication sources received for the author, the author word frequency mapping program 600 determines whether a lexicon frequency index exists for the author (decision step 606). For the case in which author word frequency mapping program 600 determines that a lexicon frequency index does not already exist for the author (step 608, "NO" branch), author word frequency mapping program 600 generates a lexicon frequency index for the author based on tokens obtained from communication content sources in step 604. For the case in which author word frequency mapping program 600 determines that a lexicon frequency index for the author does already exist (step 610, "Yes" branch), author word frequency mapping program 600 updates a lexicon frequency index for the author and a reference frequency index based on tokens obtained from communication content sources in step 604. The reference lexicon frequency index may be generated and updated as more tokens are obtained from communication content sources. The reference lexicon frequency index is based on how often particular tokens are used within the communication content sources received for a plurality of authors. This assists in identifying tokens that occur at a higher frequency in an author's works, and also occur at a higher frequency in the works of other authors. As will be discussed below, the reference frequency index may be used as a screener to remove naturally occurring high frequency tokens from the lexicon frequency index of an author.

Having built and/or updated the lexicon frequency index for the author and having updated the reference frequency index, author word frequency mapping program 600 then determines whether there are additional communication content sources to analyze for the author (decision step 612). If additional communication content sources are received for the author, author word frequency mapping program 600 updates the lexicon frequency index of the author as well as updates the reference frequency index based on newly generated tokens. For example, in some embodiments of the present invention, additional communication content sources result in additional tokens being generated, which may be added to the lexicon frequency index of the author and the reference lexicon frequency index. For the case in which author word frequency mapping program 600 recognizes that additional communication content sources are received (step 612, "YES" branch), mapping program 600 returns to step 602 to receive an additional communication content source and proceeds as described above. In this case, author word frequency mapping program 600 receives the additional communication content source and then proceeds to utilize tokenization to update the lexicon frequency index for the specific author and update the reference frequency index of the plurality of authors.

For the case in which author word frequency mapping program 600 recognizes additional communication content sources are not received (step 612, "NO" branch), author word frequency mapping program 600 stores the lexicon frequency index of the author and the reference frequency index of the author in database 414, in which each frequency index is ranked by token frequency (step 614). Author word frequency mapping program 600 then screens the frequency index of the author against the reference frequency index to identify the high frequency words as compared to other authors (step 616).

The process of ranking and screening the lexicon frequency index of the author and the reference frequency index allows server 408 to identify the "cinnamon words" of a given author. For example, in some embodiments of the present invention, author word frequency mapping program 600 identifies, from the lexicon frequency index of the author and the reference frequent index, a subset of tokens that have a higher occurrence frequency in the lexicon frequency index of the author as compared to in the reference frequency index. Author word frequency mapping program 600 screens the lexicon frequency index of the author against the reference frequency index to remove the subset of tokens from the frequency index of the author. Author word frequency mapping program 600 then identifies, as the high frequency words, a subset of tokens of the screened frequency index of the author that have an occurrence frequency higher than a predetermined threshold occurrence frequency. In some embodiments of the present invention the predetermined threshold occurrence frequency is a fixed number such as a top number of tokens found in the screened frequency index of the author (e.g., top 10 tokens, top 15 token, top 20 tokens, etc.). In some embodiments of the present invention the predetermined threshold occurrence frequency is a predetermined or variable percent of the highest frequency tokens of the screened frequency index of the author (e.g., top 5% of total tokens, top 10% of total tokens, top 15% of total tokens, etc.).

Figure 7:
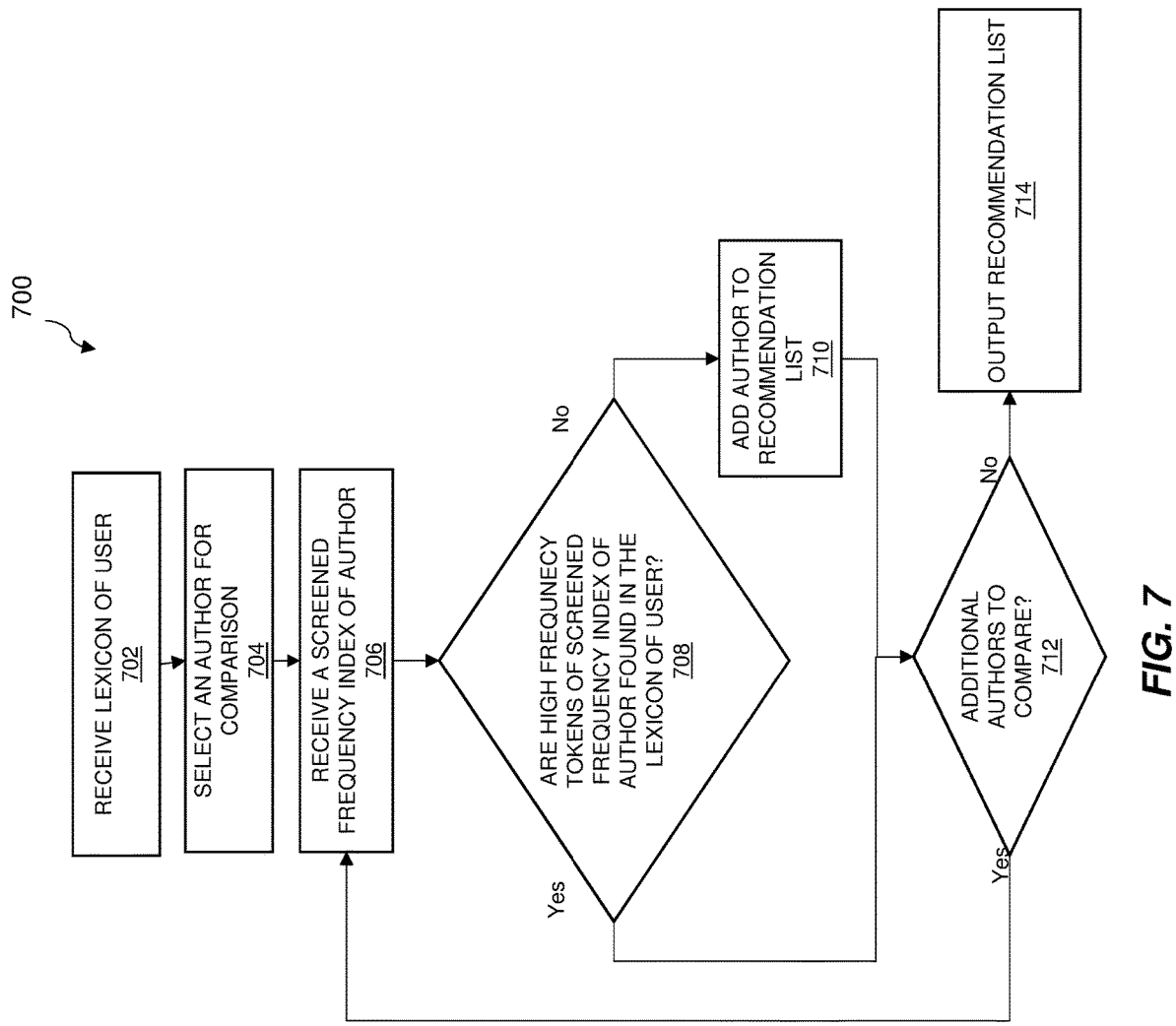
FIG. 7 depicts example operational steps of an example author recommendation program, on a computer server, within the distributed data processing environment of FIG. 4, in accordance with one or more embodiments of the present invention.

FIG. 7 illustrates operational steps of author recommendation program 700, on computer server 408, within distributed data processing environment 400 of FIG. 4, for recommending one or more authors to a user based on determining whether high frequency words used by the author (i.e., "cinnamon words") exist in the lexicon of the user (i.e., set of words known to the user), in accordance with an embodiment of the present invention.

Author recommendation program 700 receives the lexicon of the user (step 702). Author recommendation program 700 selects an author from a plurality of authors whose work is stored in database 414 for comparison to the lexicon of the user (step 704). In some embodiments of the present invention, the selection of the author is a sequenced selection that allows for the selection of each author of the plurality of authors at least once, such as for example via round-robin. In some embodiments of the present invention, the selection of the author is based on a subset of authors preselected by the user via user interface 406 of FIG. 4. For example, the lexicon profile of the user may indicate a preference for a certain genre or for a certain group of authors and thus author recommendation program 700 limits the selection of authors to only authors associated with the genre or group preselected by the user.

Author recommendation program 700 receives the screened frequency index of the selected author (step 706). Having obtained the screened lexicon frequency index for the user, author recommendation program 700 compares a subset of tokens of the screened frequency index of the author index to the lexicon of the user to determine whether one or more high frequency words of the author (i.e., "cinnamon words") exist in the lexicon of the user. For the case in which author recommendation program 700 recognizes that one or more high frequency words of the author do not exist in the lexicon of the user (step 708, "NO" branch), author recommendation program 700 adds the author to a recommendation list (step 710). For the case in which author recommendation program 700 recognizes that the high frequency words of the author do exist in the lexicon of the user (step 708, "YES" branch), author recommendation program 700 does not add the author to the recommendation list but rather proceeds to step 712 and determines whether there are additional authors to compare. For the case in which author recommendation program 700 recognizes that there are other authors to compare (step 712, "YES" branch), author recommendation program 700 returns to step 706 and a screen frequency index for another author is obtained for comparison and proceeds as described above. In this case, author recommendation program 700 recognizes that there are no other authors to compare (step 712, "No" branch), author recommendation program 700 then outputs and transmits the recommendation list to the user (step 714), in which the list includes all of the authors that were added.

In some embodiments of the present invention, prior to transmission of the recommendation list to the user, the authors of the recommendation list may be ranked and/or sorted based on the number of high frequency words (i.e., "cinnamon words") not found in the user's lexicon. In some embodiments of the present invention, prior to transmission of the recommendation list to the user, the authors of the recommendation list may be ranked and/or sorted based on a user preference, such as ranked based on genre or content source. For example, in some embodiments of the present invention, if a user has a preference for reading online publications as compared to reading hardcover books, the recommendation list may rank authors based on how many online publications are associated with the recommended authors. In some embodiments of the present invention, prior to transmission of the recommendation list to the user, the recommendation list may be ranked and sorted based on reading level.

In some embodiments of the present invention, if a token frequency pertaining to each processed communication source of the communication content of each author is stored in database 414 (e.g., token frequency for each book of an author is stored), author recommendation program 700 may be configured to recommend specific books for authors that are listed in the recommendation list.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for recommending at least one author, of a plurality of authors, to a user based on a learned lexicon of the user, the computer-implemented method comprising:

receiving, by a system comprising one or more processors, first communication content pertaining to a user, the first communication content comprising one or more content sources read by the user or written by the user;

receiving, by the system, second communication content pertaining to an author, the second communication content comprising one more content sources written by the author;

learning, by the system, a lexicon of the user from the first communication content to identify a set of words known to the user, wherein learning a lexicon of the user from the first communication content to identify a set of words known to the user comprises:

generating tokens corresponding to the first communication content by applying natural language processing to the first communication content;

generating a frequency index for the user based on the tokens generated from the first communication content, wherein the first communication content comprises data sources written by the user and data sources read by the user; and identifying, from the frequency index for the user, a first subset of tokens that have an occurrence frequency in the first communication content that is higher than a second predetermined threshold occurrence frequency level, wherein the identified set of words known to the user comprise the subset of tokens identified from the frequency index for the user;

identifying, by the system, high frequency words from the second communication content of the author, the high frequency words comprising one or more words having an occurrence frequency in the second communication content that is higher than a first predetermined threshold occurrence frequency level;

wherein identifying high frequency words from the second communication content of the author comprises:

obtaining a reference frequency index for a plurality of authors, the reference frequency index comprising tokens generated from communication content pertaining to each author of a plurality of authors, wherein the author is not the user;

generating tokens corresponding to the second communication content by applying natural language processing to the second communication content;

generating a frequency index for the author based on the tokens generated from the second communication content;

updating the reference frequency index based on the tokens generated from the second communication content;

identifying, from the frequency index of the author and the reference frequency index, a subset of tokens that have a higher occurrence frequency in the frequency index of the author as compared to in the reference frequency index;

screening the frequency index of the author against the updated reference frequency index to remove the subset of tokens; and identifying, as the high frequency words, a subset of tokens of the screened frequency index of the author that have an occurrence frequency higher than the first predetermined threshold occurrence frequency level, wherein the identified high frequency words comprise the identified one or more tokens; and suggesting, by the system, the author to the user upon detecting that the high frequency words are not in the lexicon of the user.

2. The computer-implemented method of claim 1, wherein receiving first communication content pertaining to a user comprises:

receiving a lexicon profile of a user from a client device associated with the user, wherein the lexicon profile includes links to social data sources associated with the user, wherein the social data sources comprise sources read by the user and/or sources written by the user.

3. The computer-implemented method of claim 1, wherein the frequency index of the user assigns higher weights to tokens that are generated from the data sources written by the user as compared to tokens that are generated from data sources read by the user.

4. The computer-implemented method of claim 1, wherein suggesting the author to the user upon detecting that the high frequency words are not in the lexicon of the user comprises:

comparing the subset of tokens of the screened frequency index of the author to tokens of the frequency index of the user to determine whether the high frequency words exist in the lexicon of the user;

upon determining that the high frequency words of the author do not exist in the lexicon of the user, adding the author to a recommendation list; and transmitting the recommendation list to the user.

5. The computer-implemented method of claim 1, wherein at least one source of the first communication content is a history of websites viewed, a history of books read, an online journal history, a publication, a social media post, an email, a SMS text message, or a locally stored document.

6. A computer program product for recommending at least one author, of a plurality of authors, to a user based on a learned lexicon of the user, the computer program product comprising a computer readable storage medium having program instructions embodied therewith, the program instructions executable by a system comprising one or more processors to cause the system to perform a method, the method comprising:

receiving, by the system, first communication content pertaining to a user, the first communication content comprising one more content sources written by the user or read by the user;

receiving, by the system, second communication content pertaining to an author, the second communication content comprising one more content sources written by the author;

learning, by the system, a lexicon of the user from the first communication content to identify a set of words known to the user, wherein learning a lexicon of the user from the first communication content to identify a set of words known to the user comprises:

generating tokens corresponding to the first communication content by applying natural language processing to the first communication content;

generating a frequency index for the user based on the tokens generated from the first communication content, wherein the first communication content comprises data sources written by the user and data sources read by the user; and identifying, from the frequency index for the user, a first subset of tokens that have an occurrence frequency in the first communication content that is higher than a second predetermined threshold occurrence frequency level, wherein the identified set of words known to the user comprise the subset of tokens identified from the frequency index for the user;

identifying, by the system, high frequency words from the second communication content of the author, the high frequency words comprising one or more words having an occurrence frequency in the second communication content that is higher than a first predetermined threshold occurrence frequency level;

wherein identifying high frequency words from the second communication content of the author comprises:

obtaining a reference frequency index for a plurality of authors, the reference frequency index comprising tokens generated from communication content pertaining to each author of a plurality of authors, wherein the author is not the user;

generating tokens corresponding to the second communication content by applying natural language processing to the second communication content;

generating a frequency index for the author based on the tokens generated from the second communication content;

updating the reference frequency index based on the tokens generated from the second communication content;

identifying, from the frequency index of the author and the reference frequency index, a subset of tokens that have a higher occurrence frequency in the frequency index of the author as compared to in the reference frequency index;

screening the frequency index of the author against the updated reference frequency index to remove the subset of tokens; and identifying, as the high frequency words, a subset of tokens of the screened frequency index of the author that have an occurrence frequency higher than the first predetermined threshold occurrence frequency level, wherein the identified high frequency words comprise the identified one or more tokens; and suggesting, by the system, the author to the user upon detecting that the high frequency words are not in the lexicon of the user.

7. The computer program product claim 6, wherein receiving first communication content pertaining to a user comprises:

receiving a lexicon profile of a user from a client device associated with the user, wherein the lexicon profile includes links to social data sources associated with the user, wherein the social data sources comprise sources read by the user and/or sources written by the user.

8. The computer program product of claim 6, wherein the frequency index of the user assigns higher weights to tokens that are generated from the data sources written by the user as compared to tokens that are generated from data sources read by the user.

9. The computer program product of claim 6, wherein suggesting the author to the user upon detecting that the high frequency words are not in the lexicon of the user comprises:
   comparing the subset of tokens of the screened frequency index of the author to tokens of the frequency index of the user to determine whether the high frequency words exist in the lexicon of the user;
   upon determining that the high frequency words of the author do not exist in the lexicon of the user, adding the author to a recommendation list; and
   transmitting the recommendation list to the user.

10. The computer program product of claim 6, wherein at least one a source of the first communication content is a history of websites viewed, a history of books read, an online journal history, a publication, a social media post, an email, a SMS text message, or a locally stored document.

11. A system for recommending at least one author of a plurality of authors to a user based on a learned lexicon of the user, the system comprising one or more processors configured to perform a method, the method comprising:
   receiving, by the system comprising one or more processors, first communication content pertaining to a user, the first communication content comprising one or more content sources written by the user or read by the user;
   receiving, by the system, second communication content pertaining to an author, the second communication content comprising one more content sources written by the author;
   learning, by the system, a lexicon of the user from the first communication content to identify a set of words known to the user, wherein learning a lexicon of the user from the first communication content to identify a set of words known to the user comprises:
      generating tokens corresponding to the first communication content by applying natural language processing to the second communication content;
      generating a frequency index for the user based on the tokens generated from the first communication content, wherein the first communication content comprises data sources written by the user and data sources read by the user; and
      identifying, from the frequency index for the user, a first subset of tokens that have an occurrence frequency in the first communication content that is higher than a second predetermined threshold occurrence frequency level, wherein the identified set of words known to the user comprise the subset of tokens identified from the frequency index for the user;
   identifying, by the system, high frequency words from the second communication content of the author, the high frequency words comprising one or more words having an occurrence frequency in the second communication content that is higher than a first predetermined threshold occurrence frequency level;
   wherein identifying high frequency words from the second communication content of the author comprises:
      obtaining a reference frequency index for a plurality of authors, the reference frequency index comprising tokens generated from communication content pertaining to each author of a plurality of authors, wherein the author is not the user;
      generating tokens corresponding to the second communication content by applying natural language processing to the second communication content;
      generating a frequency index for the author based on the tokens generated from the second communication content;
      updating the reference frequency index based on the tokens generated from the second communication content;
      identifying, from the frequency index of the author and the reference frequency index, a subset of tokens that have a higher occurrence frequency in the frequency index of the author as compared to in the reference frequency index;
      screening the frequency index of the author against the updated reference frequency index to remove the subset of tokens; and
      identifying, as the high frequency words, a subset of tokens of the screened frequency index of the author that have an occurrence frequency higher than the first predetermined threshold occurrence frequency level, wherein the identified high frequency words comprise the identified one or more tokens; and
   suggesting, by the system, the author to the user upon detecting that the high frequency words are not in the lexicon of the user.

12. The system of claim 11, wherein receiving first communication content pertaining to a user comprises:
   receiving a lexicon profile of a user from a client device associated with the user, wherein the lexicon profile includes links to social data sources associated with the user, wherein the social data sources comprise sources read by the user and/or sources written by the user.

13. The system of claim 11, wherein suggesting the author to the user upon detecting that the high frequency words are not in the lexicon of the user comprises:
   comparing the subset of tokens of the screened frequency index of the author to tokens of the frequency index of the user to determine whether the high frequency words exist in the lexicon of the user;
   upon determining that the high frequency words of the author do not exist in the lexicon of the user, adding the author to a recommendation list; and
   transmitting the recommendation list to the user.

\* \* \* \* \*